(12) United States Patent
Bartsch et al.

(10) Patent No.: US 9,139,464 B2
(45) Date of Patent: Sep. 22, 2015

(54) METHOD AND APPARATUS FOR SHAPING AN ELONGATED GLASS BODY

(71) Applicant: SCHOTT AG, Mainz (DE)

(72) Inventors: Reiner Bartsch, Tirschenreuth (DE); Ralf Biersack, Schoenwald (DE); Wolfgang Pulz, Mitterteich (DE); Csaba Debreczeny, Weiden (DE)

(73) Assignee: SCHOTT AG, Mainz (DE)

( * ) Notice: Subject to any disclaimer, the term of this patent is extended or adjusted under 35 U.S.C. 154(b) by 42 days.

(21) Appl. No.: 13/962,559

(22) Filed: Aug. 8, 2013

(65) Prior Publication Data

US 2014/0041413 A1 Feb. 13, 2014

(30) Foreign Application Priority Data

Aug. 9, 2012 (DE) .......................... 10 2012 107 338

(51) Int. Cl.
  *C03B 23/049* (2006.01)
  *C03B 23/055* (2006.01)
  *C03B 23/045* (2006.01)

(52) U.S. Cl.
  CPC ........... *C03B 23/0493* (2013.01); *C03B 23/045* (2013.01); *C03B 23/055* (2013.01)

(58) Field of Classification Search
  USPC ........... 65/29.1, 187, 102, 108, 158, 160–163
  See application file for complete search history.

(56) References Cited

U.S. PATENT DOCUMENTS 4,106,847 A   8/1978 Arnaud

FOREIGN PATENT DOCUMENTS

| DE | 545449 | 2/1932 |
|---|---|---|
| DE | 1007962 | 5/1957 |
| DE | 19856892 | 6/2000 |
| DE | 102005028219 | 10/2006 |
| DE | 102006015223 | 8/2007 |
| DE | 102007051370 | 4/2009 |
| JP | S5947629 U | 3/1984 |
| JP | H03115131 A | 5/1991 |
| JP | 2005053754 | 3/2005 |
| JP | 2006294440 | 10/2006 |
| JP | 2006315919 | 11/2006 |

OTHER PUBLICATIONS

DE 102006015223, Buellesfeld et al., machine translation, Aug. 2007.*
European Search Report dated Dec. 18, 2014 for corresponding European Patent Application No. 13176968.9, 3 pages.
English translation of relevant portions of DE102006015223.

* cited by examiner

*Primary Examiner* — Mark Halpern
(74) *Attorney, Agent, or Firm* — Ohlandt, Greenley, Ruggiero & Perle, LLP (57) ABSTRACT

The invention relates to a method and apparatus for shaping an elongated glass body 81, which is a glass tube or glass rod and has an initial profile, to an elongated glass body having a different profile. In order to be properly shaped, an elongated glass body 81 passes through, in a hot malleable state, a nip, which is formed by squeezing rollers 1 and which has a nip width which is less than an outer dimension of the initial profile.
In order to accomplish an enhanced precision of the shaping process, according to the invention the position of at least one of the squeezing rollers is varied continuously so that a contact area between the respective squeezing roller and the hot glass body is varied cyclic reciprocating movement. Disturbing effects such as local overheating of the squeezing rollers or an accumulation of dirt or glass particles on the surface of the squeezing rollers can thus be effectively prevented.

16 Claims, 9 Drawing Sheets

METHOD AND APPARATUS FOR SHAPING AN ELONGATED GLASS BODY

The present application claims the priority of German Patent Application No. 10 2012 107 338, "Method and Apparatus for shaping an elongated glass body and use thereof", filed on 9 Aug. 2012, the whole content of which is hereby incorporated by way of reference.

FIELD OF THE INVENTION

The present invention relates generally to the production of elongated glass bodies by shaping a glass body having an initial profile, in a hot malleable state, to a glass body having a different profile. In particular, the present invention relates to the production of glass tubes having a profile, which is different to a circular shape, with high precision, for example for use as an oval tube or plano-convex glass body for optical imaging.

BACKGROUND OF THE INVENTION

As starting material for such glass bodies usually glass tubes or also glass rods having a circular profile may be used, which are then deformed or shaped to the desired profile in a hot malleable state.

DE 545 449 A discloses an apparatus for deforming or shaping glass tubes to glass tubes having a non-circular profile, wherein the glass tubes are conveyed through a nip while being in a heated state. An adjustment of squeezing rollers forming the nip during the shaping process is not disclosed. DE 1007962 A discloses a corresponding method for shaping glass tubes to thin insulating tapes or insulating layers.

JP 2006315919 A discloses an apparatus for shaping glass tubes to glass tubes having a non-circular profile. The positions of the squeezing rollers forming the nip can be adjusted for adjusting the profile of the glass tube after the shaping (deforming) process. An adjustment of the squeezing rollers forming the nip during the shaping process is not disclosed.

In order to accomplish a predetermined profile by deforming glass tubes, DE 19856892 A1 proposes to continuously measure the diameter and the wall thickness of the glass tube after the shaping process and to control or regulate an overpressure to be applied to the interior of the glass tube. An adjustment of the squeezing rollers forming the nip during the shaping process is not disclosed.

DE 102006015223 B3 of the Applicant discloses a method and an apparatus for producing a glass tube having a profile that differs from a circular profile. Here, the initial glass tube having the initial profile (so-called preform) first passes through a hot zone while forming of a drawing bulb and then passes a nip formed by a pair of rollers, where the drawing bulb is shaped (deformed) to a glass tube having a different profile. This shaping process is actually a process for re-drawing of the initial glass tube. During the re-drawing process, the positions of the squeezing rollers forming the nip in the direction of drawing the glass tube and/or in a direction perpendicular thereto can be adjusted. This adjustment of the positions of the squeezing rollers is for the purpose of achieving a constant profile of the glass tube after the shaping process. For this purpose, the profile of the glass tube after the shaping process may also be measured and used as a parameter for controlling or regulating. However, the adjustment of the positions of the squeezing rollers is not continuous in the sense of the present application, as disclosed below. Particularly, this adjustment is not performed such that a contact area between the respective squeezing roller and the hot glass tube in the shaping area is varied continuously.

Even if the initial glass tube is produced with high precision, the general conditions during the shaping process and the fluctuations of such general conditions lead to a precision that is not satisfactory for applications requiring a high geometric accuracy.

SUMMARY OF THE INVENTION

It is an object of the present invention to provide an enhanced method and an enhanced apparatus for shaping initial glass tubes or initial glass tubes to glass tubes or glass rods having a different predetermined profile with even higher accuracy. According to a further aspect of the present invention an enhanced method and an enhanced apparatus for producing such glass tubes or glass rods shall also be provided.

In a method for shaping an elongated glass body, which is a glass tube or glass rod and has an initial profile, to an elongated glass body having a different profile the elongated glass body passes, in a hot malleable state, through a nip, which is formed by squeezing rollers and has a nip width which is smaller than an outer dimension of the initial profile. When passing through the narrower nip the glass tube or glass rod is shaped (deformed) to a glass tube or glass rod of the desired predetermined profile. The width of the nip is thereby accurately predetermined and maintained, in order to achieve the desired accuracy along the minor axis of the elongated glass body. Fluctuations before the shaping process, which are caused by the amount of glass fed and other effects, are "transferred" to the large (un-squeezed) outer diameter of the glass tube and glass rod (which is often not so important). Thus, the dimensions can be very accurately predetermined in the direction of extension of the nip.

According to the present invention the position of at least one of the squeezing rollers is continuously varied so that a contact area between the respective squeezing roller and the hot glass body is continuously varied or changed. By this surprisingly simple measure according to the present invention glass bodies can be produced with even higher precision, because according to the present invention the area of contact between the hot glass and the squeezing rollers varies continuously. As a result, various problems can be prevented in comparison to conventional squeezing units operated with a (quasi-) stationary position of the squeezing rollers. Quasi-stationary in this context means especially that the position of contact between the squeezing rollers and the hot glass is not varied. Damages or scratches in the glass surface caused by overheated squeezing rollers, small glass particles or the like can thus be torn from the surface of the glass body during squeezing or deformation and would thus do not affect the further shaping or deformation process. Different temperatures on the surface of the squeezing rollers that conventionally result in different widths of the nip and thus result in poor tolerances due to the variation of the contact area, can be also reduced. Furthermore, an undesirable overheating of the contact surface between the glass body and the squeezing rollers can be prevented, which conventionally had often resulted in clearly visible undesirable "heat tracks" on the outer surface of the glass body. The squeezing rollers may also be used in the method of the present invention over a longer period. Particularly, according to the present invention a mechanical polishing of the squeezing rollers before their reuse, if at all required, in any event is necessary less often. By means of the method according to the present invention also a smoother and more constant outer surface of the glass body can be achieved.

Due to their continuous adjustment in general the squeezing rollers can be operated without cooling, which often caused additional problems in a conventional method concerning the dimensional accuracy of the squeezed glass body.

Preferably, the nip is formed by two opposite squeezing rollers which are each mounted displaceable and extending in parallel with each other. Although in general according to the present invention it may be sufficient if the position of only one of these two squeezing rollers is adjusted continuously (in axial direction), preferably the positions of both squeezing rollers is continuously adjusted (in axial direction). Preferably, both squeezing rollers are axially adjusted together and in synchronysm with each other.

In order to achieve the aforementioned continuous adjustment of the respective squeezing roller, an adjusting device or drive is associated with the respective squeezing roller, which is coupled to the respective squeezing roller and adjusts it such that a contact area between the respective squeezing roller and the hot glass body is continuously varied or changed.

According to a further embodiment the aforementioned continuous adjustment of the respective squeezing roller may be performed while maintaining the actual nip width between the squeezing rollers that form the nip. This does not exclude that, in addition, also the width of the nip between the squeezing rollers that form this nip is controlled or regulated, for example in order to achieve a constant outer dimension of the glass body or a constant wall thickness thereof. The adjustment of the respective squeezing roller and such a control or regulation of the width of the nip, however, are preferably not coupled to each other and are performed for a completely different purpose. This can for example also result in considerably different time scales involved in the continuous adjustment of the position(s) of the respective squeezing roller(s) and in the controlling or regulation of the width of the nip.

According to a further embodiment, the position of said at least one squeezing roller and preferably of the two squeezing rollers is varied by means of a continuous axial adjustment of the squeezing rollers in accordance with a predetermined function. Suitably, this function is carried out mainly steadily and can for example be carried out according to a sawtooth or sinusoidal signal, for which purpose it should be ensured that a too-long persistence of the squeezing roller(s) at the same position is avoided, because otherwise the disadvantages of the conventional shaping process would occur again.

According to a preferred further embodiment, the function is performed as a cyclic reciprocating displacement of the respective squeezing roller or preferably of both squeezing rollers forming the nip in the axial direction thereof. Preferably, this reciprocating displacement is symmetric in time.

According to a further embodiment, the function is performed in discrete steps of the same step size, which favors the implementation of the function using standard synchronous motors or stepper motors or the like.

According to a further embodiment, a rotational movement of the squeezing rollers forming the nip is driven separately. This enables an adjustment of the profile of the glass body with high-precision after the shaping process, for example a precise adjustment of the oval shape of an oval tube to be produced. Preferably, the squeezing rollers are driven in synchronism with the speed at which the glass body is passed through the nip.

According to a further embodiment the rotational movement of the squeezing rollers forming the nip is driven in synchronism or with a predetermined constant offset, so that it is possible to vary the drawing speed at which the glass body is drawn through the nip and at the same time to vary the speed of the squeezing rollers automatically.

According to a further embodiment, an outer dimension and/or internal dimension of said different profile of the glass body is detected downstream of the nip and a parameter relevant for the shaping of the hot, malleable glass body to a glass body having said different profile is controlled or regulated according to the detected outer dimension and/or internal dimension of said different profile to maintain the outer dimension and/or internal dimension of said different profile constant.

For this purpose, for example, the outer diameter and/or the inner diameter may be measured and monitored continuously by means of an optical measuring method, which is performed downstream of the nip and is suitably performed upstream of a drawing device which draws the glass body through the nip. In the case of an undesired fluctuation the relevant parameter can then be readjusted or regulated in order to achieve an even higher precision.

According to a further embodiment, the squeezing rollers that form the nip are automatically measured, in particular their true-running characteristics and/or their outer diameter, and these squeezing rollers are then positioned relative to each other by means of a regulating means such that the true-running errors and/or fluctuations of the outer diameter, based on the nip width, are minimum.

According to a further embodiment this parameter may be the width of the nip, a respective rotational speed or differential rotational speed of the squeezing rollers forming the nip or an over-pressure to be applied to an inner volume of the malleable glass body embodied as a glass tube.

According to a further embodiment the glass body is marked and/or sorted out according to the outer dimension and/or internal dimension detected downstream of the nip. Thus batches having predetermined tolerances can be produced easily.

A further aspect of the present invention relates to a method for manufacturing (producing) an elongated glass body in the form of a glass tube or glass rod, in which method the elongated glass body is drawn from a glass melt to a glass tube or glass rod having an initial profile, and this glass tube or glass rod is then shaped (deformed) in a hot, malleable state to a glass tube or glass rod having a different profile by means of a method as outline above.

In order to accomplish the aforementioned adjustment of the squeezing rollers, at least one adjusting device is associated with the squeezing rollers, and preferably with each of the squeezing rollers. According to a preferred embodiment, the adjusting device comprises a translation stage and an adjusting motor for adjusting said translation stage, wherein the squeezing rollers are supported on the translation stage, wherein the translation stage is mounted so as to be displaceable in axial direction of the squeezing rollers and wherein the adjusting motor is coupled to the translation stage to effect said axial adjustment of the at least one squeezing roller by adjusting the translation stage.

OVERVIEW ON DRAWINGS

The invention will now be described by way of example and with reference to the accompanying drawings, from which further features, advantages and problems to be solved will be apparent. In the drawings.

In the drawings, identical reference numerals designate identical or substantially equivalent elements or groups of elements.

DETAILED DESCRIPTION OF PREFERRED EMBODIMENTS

Figure 1:
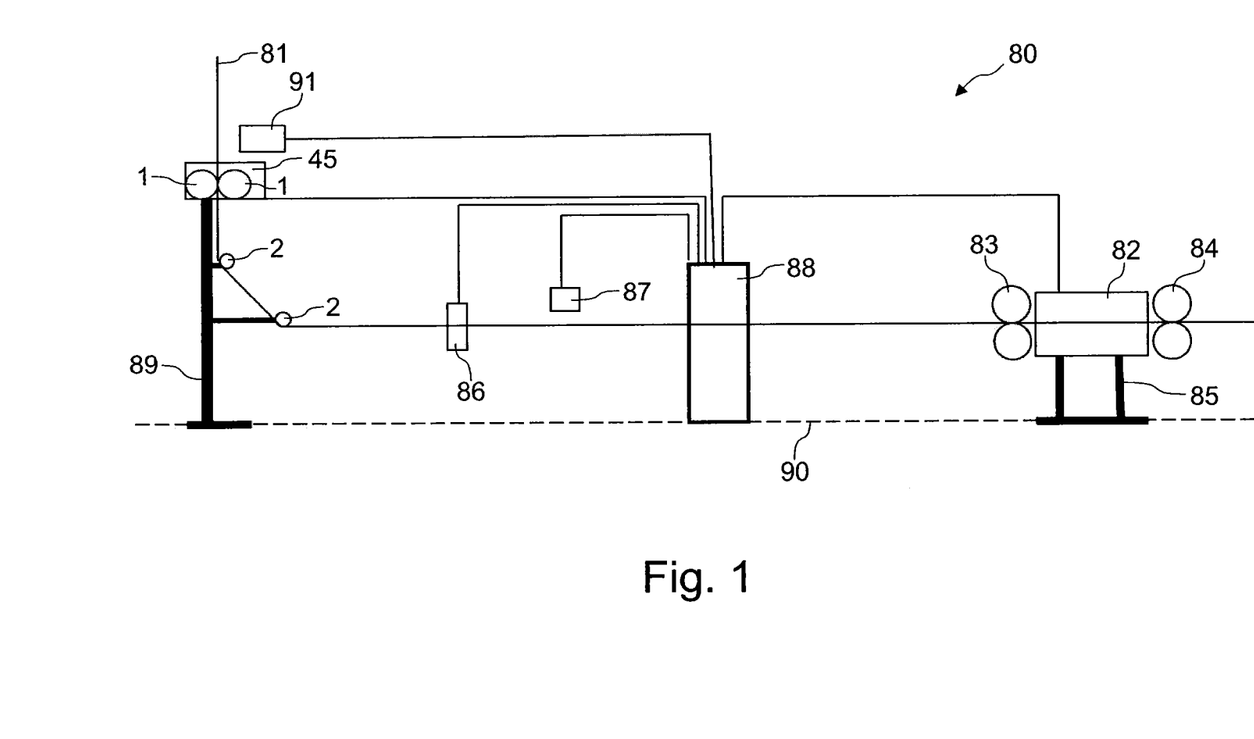
FIG. 1 shows a schematic view of a production plant for glass tubing according to the present invention.

According to FIG. 1, the apparatus generally designated by reference numeral 80 comprises a frame 89 on which two squeezing rollers 1 are mounted for shaping the glass tubing strand 81 entering the nip formed by these squeezing rollers 1 and on which two guide pulleys 2 are mounted downstream of the squeezing rollers 1 for deflecting the shaped glass tubing strand 81 towards the drawing device 82, which comprises two pairs of drawing rollers 83, 84. A cover 45, in which the squeezing rollers 1 are disposed, shields the region of shaping around the squeezing rollers 1 from the external environment.

The outer diameter of the glass tubing strand 81 is measured in a contact-less manner by means of a measurement device 86 preferably and most preferably optically. The inner diameter of the glass tubing strand 81 is measured optically by means of a measurement device 87, in particular using a triangulation method. The point of measurement of the measurement device 87 is preferably located as close to the point of measurement of the measurement device 86 as possible. Furthermore, characteristics of the two squeezing rollers 1 are measured or monitored automatically, for example by means of an inductive measurement method, e.g. for detecting the true-running errors and/or fluctuations of the outer diameter of the squeezing rollers.

As indicated by the connecting lines in FIG. 1, the relevant components of the plant 80 can be controlled or regulated by a controlling or regulating means 88, in particular by a CPU based on a software designed for this purpose. In this manner a control or regulation to a constant outer diameter of the glass tubes or glass rods or to a constant wall thickness of the glass tube can be implemented or such that the true-running errors of the squeezing rollers 1, in relation to the width of the nip formed by the squeezing rollers 1, is minimum is implemented.

Figure 2:
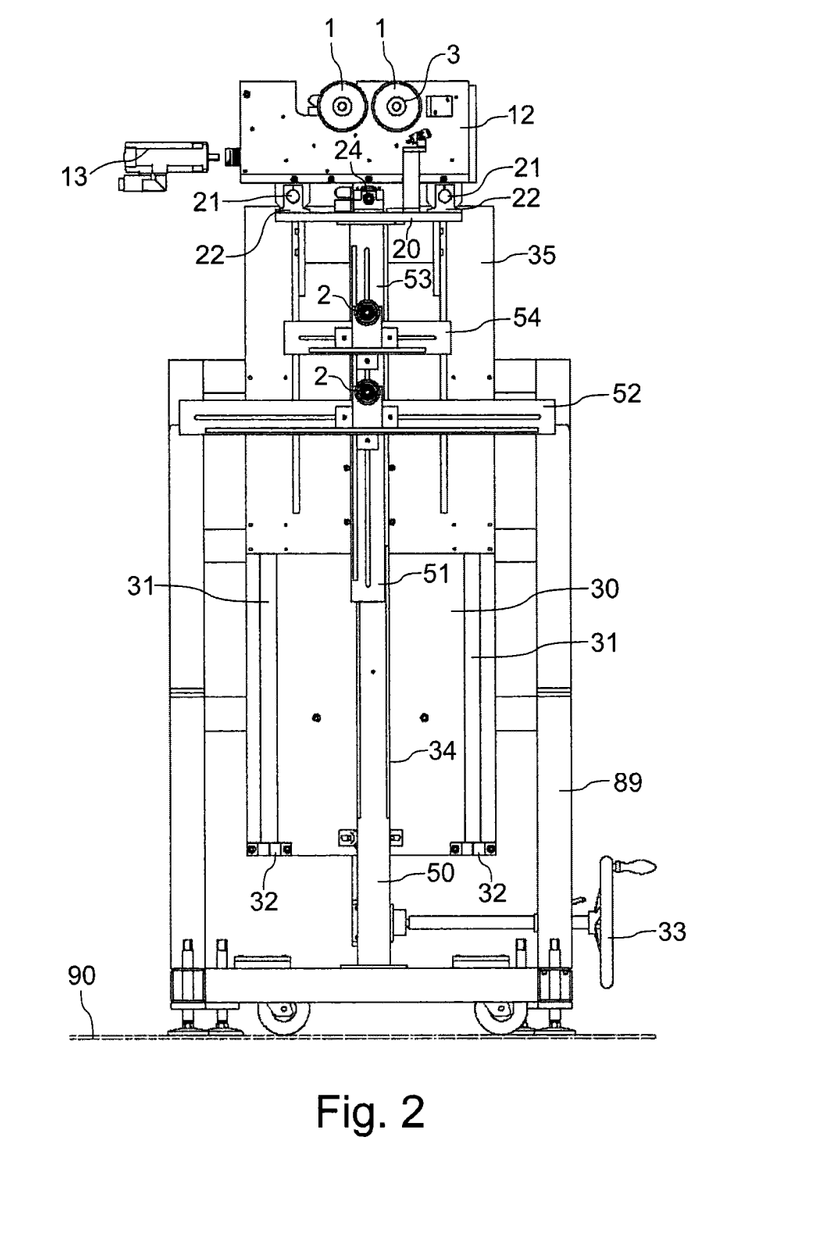
FIG. 2 shows in a front view an apparatus for shaping according to a first embodiment of the present invention.

FIG. 2 shows a front view of an apparatus for shaping according to a first embodiment of the present invention. A base plate 30 is mounted to a machine frame 89 supported on as bottom 90, and a translation stage 35 is mounted to this base plate 30 so as to be vertically displaceable, in order to enable an adjustment of the height of the squeezing rollers 1.

This height adjustment can be performed manually using the hand wheel 33, but may also be motorized.

Two guide rods 31 are mounted to the base plate 30, which guide the translation stage 35 vertically. The adjustment is accomplished by means of a threaded spindle 34 which is engaged or coupled, on the one hand, with the hand wheel 33 acting as a vertical adjustment means and, on the other, with the translation stage 35.

According to FIG. 2, the supporting plate 20, on which the squeezing rollers (not shown) are mounted, are connected with the vertical translation stage 35 via a horizontal adapter 38 and a vertical adapter 37. Thus, the height position of the squeezing rollers 1 can be adjusted by adjusting the hand wheel 33. The height position is adjusted such that along the glass tubing strand, which rapidly cools in the direction of drawing, a temperature range is provided in which the glass tubing strand is suitably plastic so that it can be deformed or shaped precisely. This height position can be adjusted once, for example, when starting operation of the plant, or can be adjusted continuously or cyclically by means of the controlling or regulating means 88.

Referring to FIG. 2, the height positions of the deflecting pulleys 2 and their positions transverse to the withdrawal direction of the glass tubing strand can be precisely adjusted or readjusted independently from each other using the height adjustment means 51 and 53 and the transverse adjustment means 52 and 54.

Figure 3:
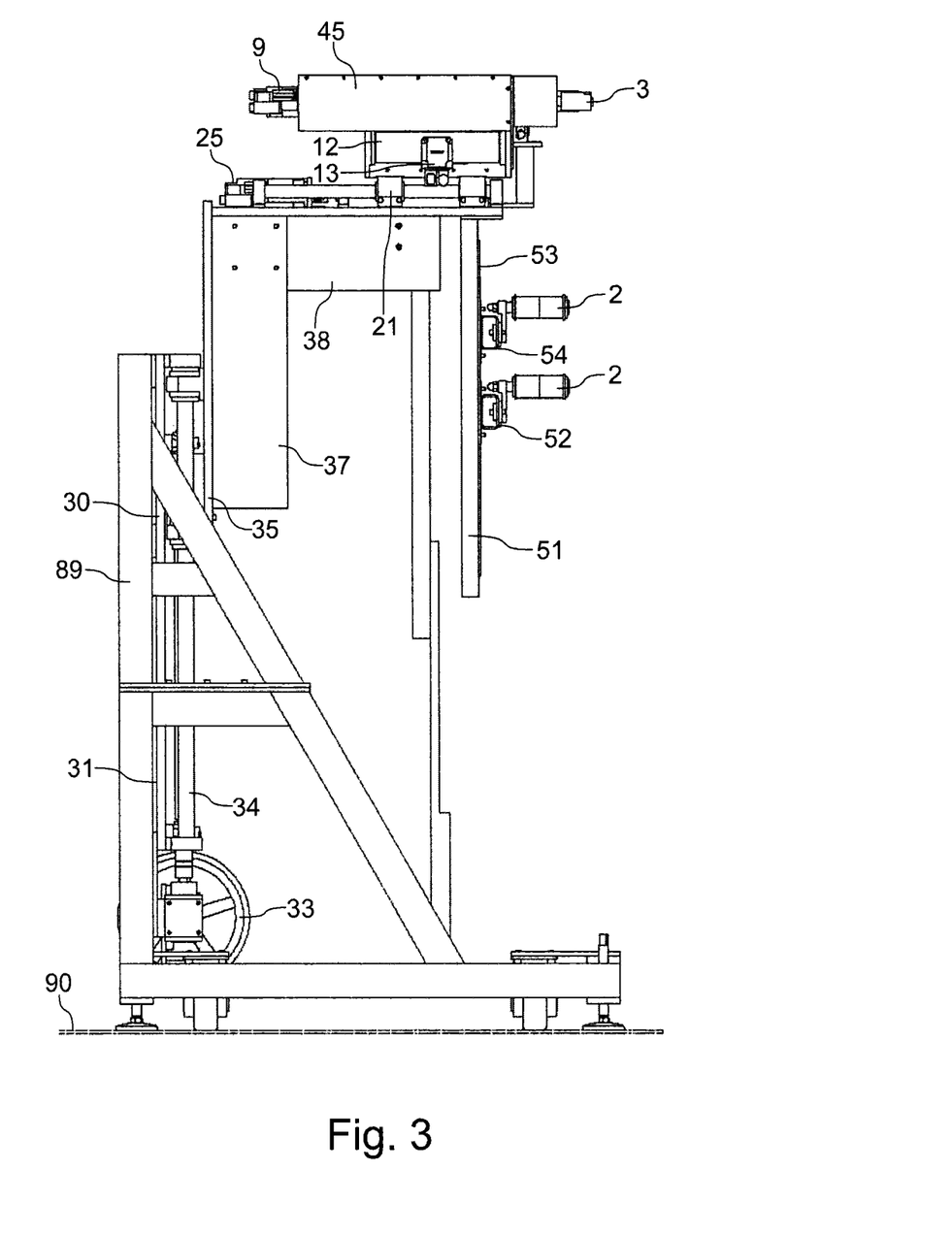
FIG. 3 shows the apparatus of FIG. 2 in a side view.

FIG. 3 shows the apparatus of FIG. 2 in a side view.

Figure 4A:
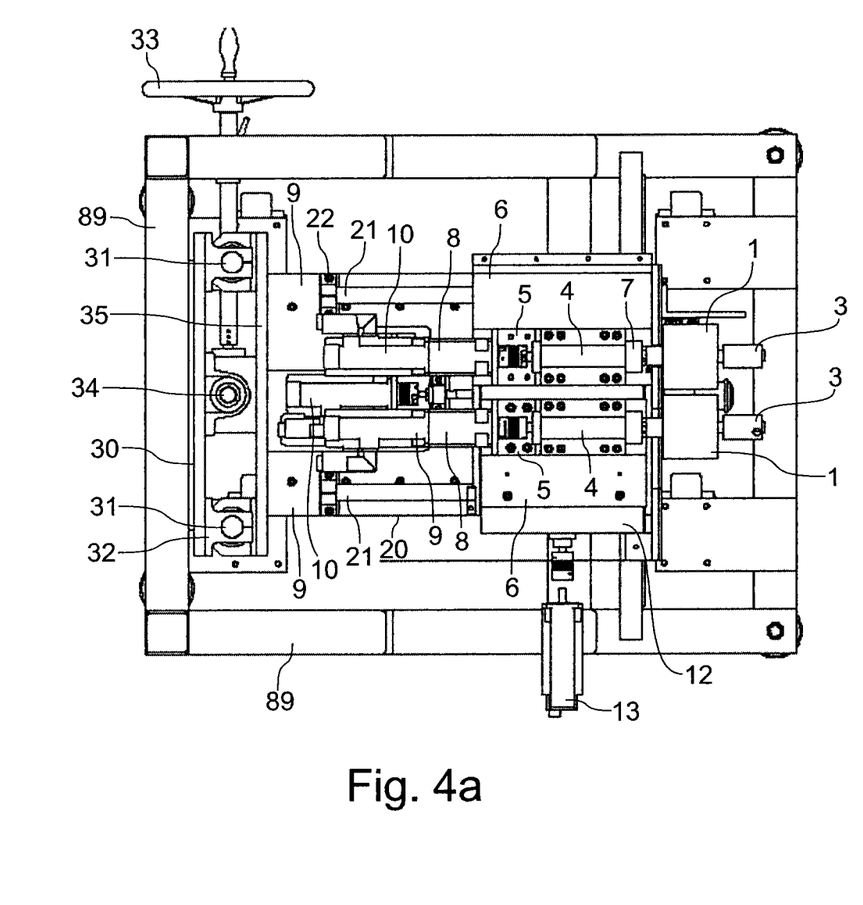
FIG. 4a shows the apparatus of FIG. 2 in a top view without a cover used for shielding the region of shaping.
Figure 6:
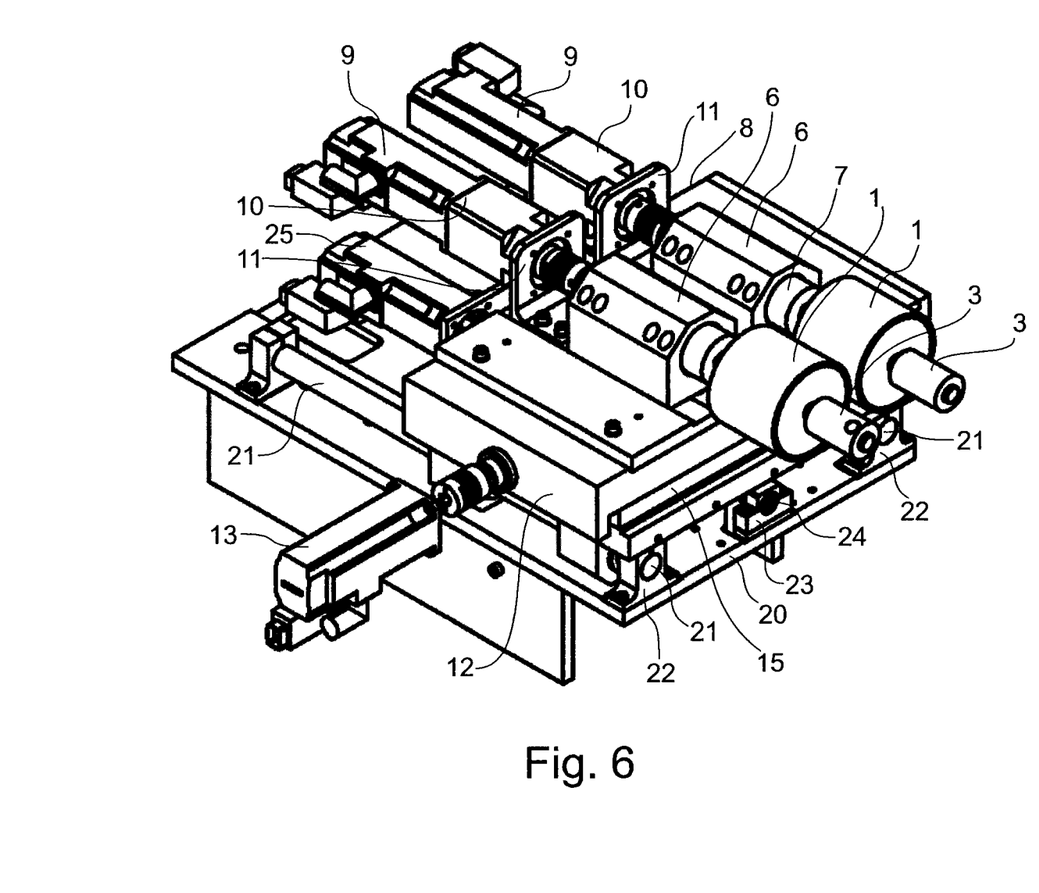
FIG. 6 is a perspective plan view of the upper portion of the apparatus of FIG. 2 with the squeezing rollers.

The further structure used for adjusting the squeezing rollers 1 may be concluded in particular from the top view of FIG. 4a and the perspective view according to FIG. 6 The two squeezing rollers 1 forming a nip are mounted on a translation stage 12 which supports the two squeezing rollers 1. The translation stage 12 can be adjusted in axial direction of the squeezing rollers 1 by means of the adjusting motor 25 for adjusting (displacing) both squeezing rollers 1 together in axial direction.

According to a further embodiment (not shown), the two squeezing rollers 1 forming a nip can be supported on a two-part translation stage 12, one part of which supports one of the two squeezing rollers 1 and the other part of which supports the other of the two squeezing rollers 1. While according to this embodiment a first part of the translation stage 12 is held stationary during the shaping process, the other part of the translation stage 12 may be adjusted in the axial direction of the squeezing rollers 1 relative to the first part of the translation stage 12 by means of the adjusting motor 25.

For guiding the translation stage 12, two mutually parallel guide rods 21 are mounted on the base plate 20 in respective bearing blocks 22. Slide members (not shown) provided on the underside of the translation stage 12, which engage the guide rods 21, guide the axial displacement of the translation stage 12. For adjusting the translation stage 12 a threaded adjustment spindle 24 is further supported on the supporting plate, which is rotationally driven by the servomotor 25 and engages in a counter-thread (not shown) on the underside of the translation stage 12.

The adjusting motor 25 is designed as a synchronous motor, but may also be designed as a stepping motor to allow a step-wise axial displacement, as described in more detail below.

Referring to FIG. 6 further a transverse guide rail 15 is provided on the translation stage 12, which guides the adjustment of the translation stage 12 (or according to the above alternative embodiment of the first part relative to the second part of the translation stage 12) during the adjustment of the width of the nip. For adjusting the width of the nip a servomotor 13 is provided, which is mounted to the supporting plate 20. Thereby, the adjustable squeezing roller 1 can be adjusted relative to the other squeezing roller 1, which is held stationary.

It should be noted that in principle also both squeezing rollers 1 can be adjusted axially.

For driving the rotational movement of the squeezing rollers 1, two servomotors 9 are provided, which are coupled to the associated squeezing roller 1 via a respective gear unit 10 and a respective clutch 8. The clutch 8 is accommodated in a clutch housing having a front end 11, which is formed flange-like and through which the clutch 8 extends. The clutch 8 couples with the spindle shaft 4, which is supported by means of bearings 5/spindle bearings 7 in a respective bearing block 6 formed as a housing. The squeezing rollers 1 may be mounted to mounting flanges at the front end of the respective spindle shaft 4.

A respective rotary lead-through 3 engages in the front end of the squeezing rollers 1, which may be cooled with air or a fluid, such as water, in order to further cool down the squeezing rollers 1. It should be noted, however, that due to the axial displacement of the squeezing rollers 1, which according to the present invention is carried out continuously during the shaping of the glass tube, such a cooling is not absolutely necessary and may be omitted.

It is possible to control the rotational speed of both squeezing rollers 1 separately. Furthermore, this rotational speed is detected digitally very accurately and is indicated very accurately. This is advantageous for adjusting the shape of the oval tube.

It is possible to synchronize the rotational speeds of the squeezing rollers 1 with the speed of the drawing machine 82 (FIG. 1) at the glass strand or to couple the rotational speeds of the squeezing rollers 1 with a fixed offset. I.e. one may vary the speed of drawing the glass strand and as a result the speed of the squeezing rollers is varied automatically as well.

Figure 4B:
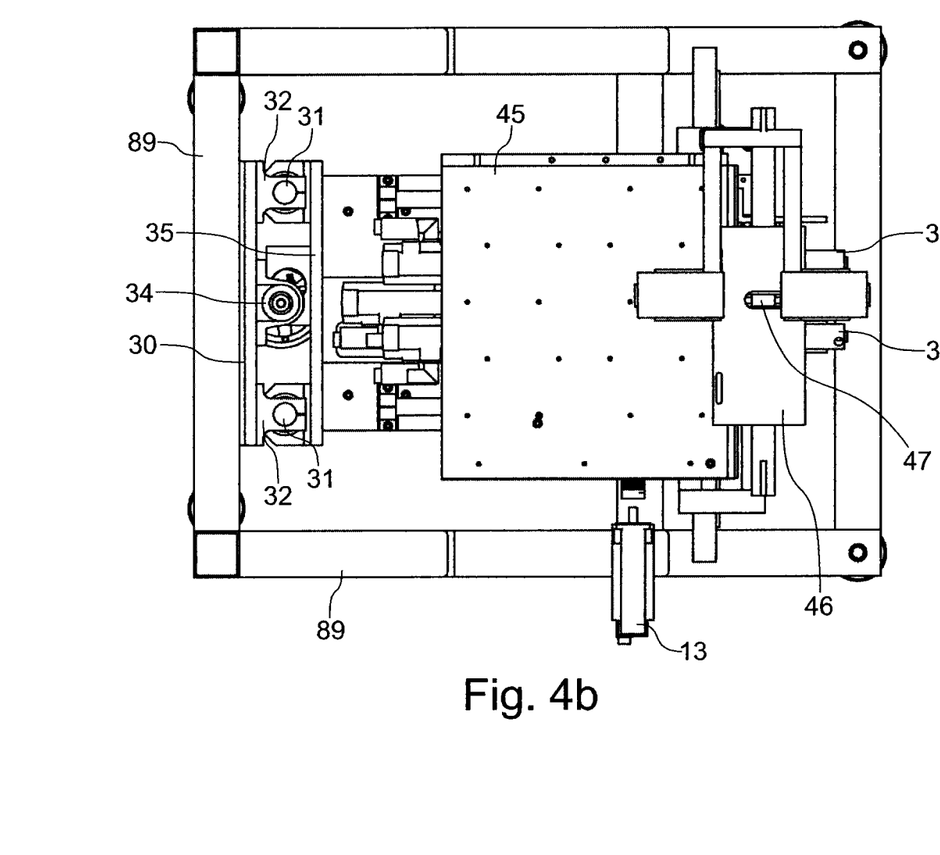
FIG. 4b shows the apparatus of FIG. 2 in a plan view together with the cover used for shielding the region of shaping.

As can be seen in FIG. 4b, in operation the squeezing rollers are jointly accommodated in a housing 45 and covered by a further cover 46, in which an opening 47 is formed, through which the glass tubing strand enters the nip from above for the shaping process.

During the shaping of the glass tube strand in the nip the position(s) preferably of both squeezing rollers 1 is(are) jointly varied by continuously axially adjusting the positions of the squeezing rollers so that a contact area between the respective squeezing roller and the hot glass body is varied or changed continuously. Preferably this continuous axial adjustment of the positions of the squeezing rollers is performed in accordance with a predetermined function. This predetermined function is preferably a cyclic reciprocating movement of the respective squeezing roller 1 in the axial direction thereof corresponding to a sawtooth function or a sinusoidal function or any similar function, which is preferably performed continuously in time. This will be performed in discrete steps of the same step size.

The precise structure of the system as outlined above enables the adjustment of the movable squeezing roller relative to the stationary squeezing roller at micrometer accuracy. Flaws in the region of the nip can be reduced, on the one hand, by means of the covers 46 and 47 and can be minimized, on the other hand, by means of the controlling or regulating device 88, as described above with reference to FIG. 1. In particular, the effects of temperature in the region of the nip can be detected by a pyrometer, and the shaping (deformation) process may be regulated either manually or automatically. Due to the above configuration of the system, the manipulation of the internal diameter of a squeezed tube at micrometer accuracy is possible with an unprecedented accuracy (for example, an accuracy of ±20 microns has been measured according to the invention). The positions of the squeezing rollers can be controlled in micro degrees, so that the respectively smallest error of the nip width of both squeezing rollers can be determined. The rotation axes of the squeezing rollers, which are driven in synchronism, may be operated at a differential speed using control technology, in order to prevent curvature effects caused by the deflection of the glass strand. The drawing speed (speed of withdrawal of the glass tube strand or glass rod strand) is determined by the drawing machine, the rollers can be operated at a speed differing therefrom in order to either generate a sag on the glass strand or to exert a pulling effect, which has a significant effect on the geometry of the squeezed glass tube. The controlling and regulating circuit of the system is formed by an optical measurement system, which measures the internal diameter of the squeezed tube with micrometer accuracy, and by the precision servomotors of the respective axes (axes of rotation of the rolls, adjustment axes). Furthermore, the pair of squeezing rollers is adjusted stepwise by means of a further servomotor to minimize the amount of wear of the squeezing rollers ahead of schedule due to the strong influence of temperature of the still plastic glass.

The plant and especially the squeezing rollers can be cooled by air or water to minimize the effects of temperature given by the on site conditions.

Figure 5A:
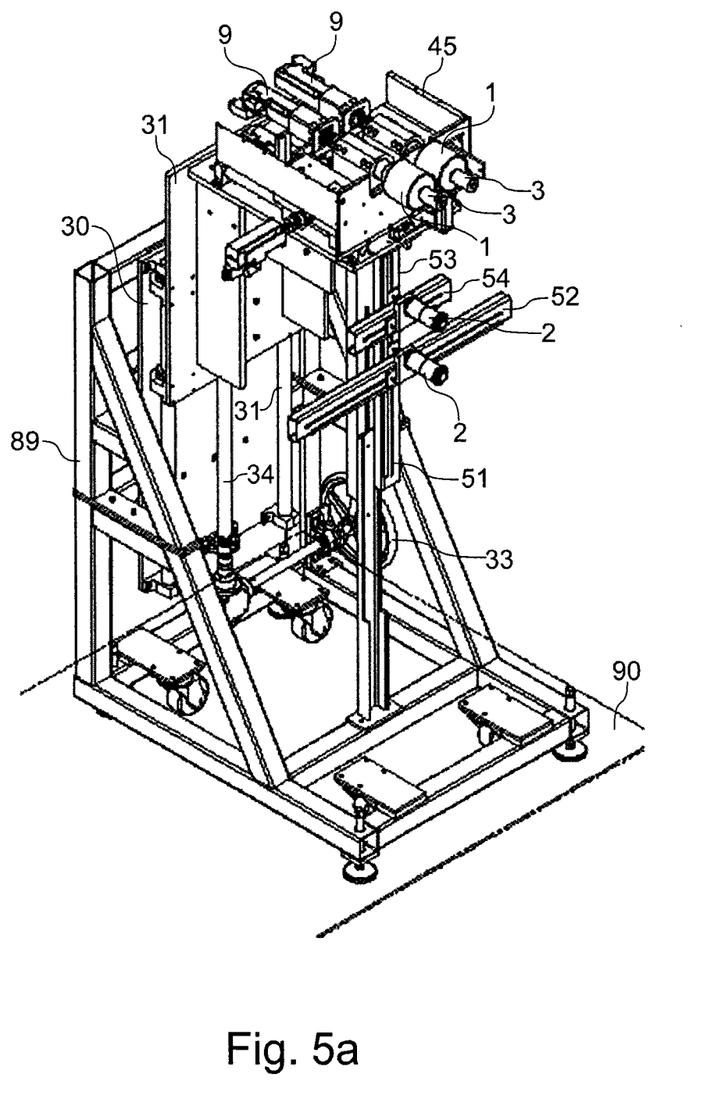
FIG. 5a is a perspective front view of an apparatus for shaping according to a second embodiment of the present invention without a cover used for shielding the region of shaping.
Figure 5B:
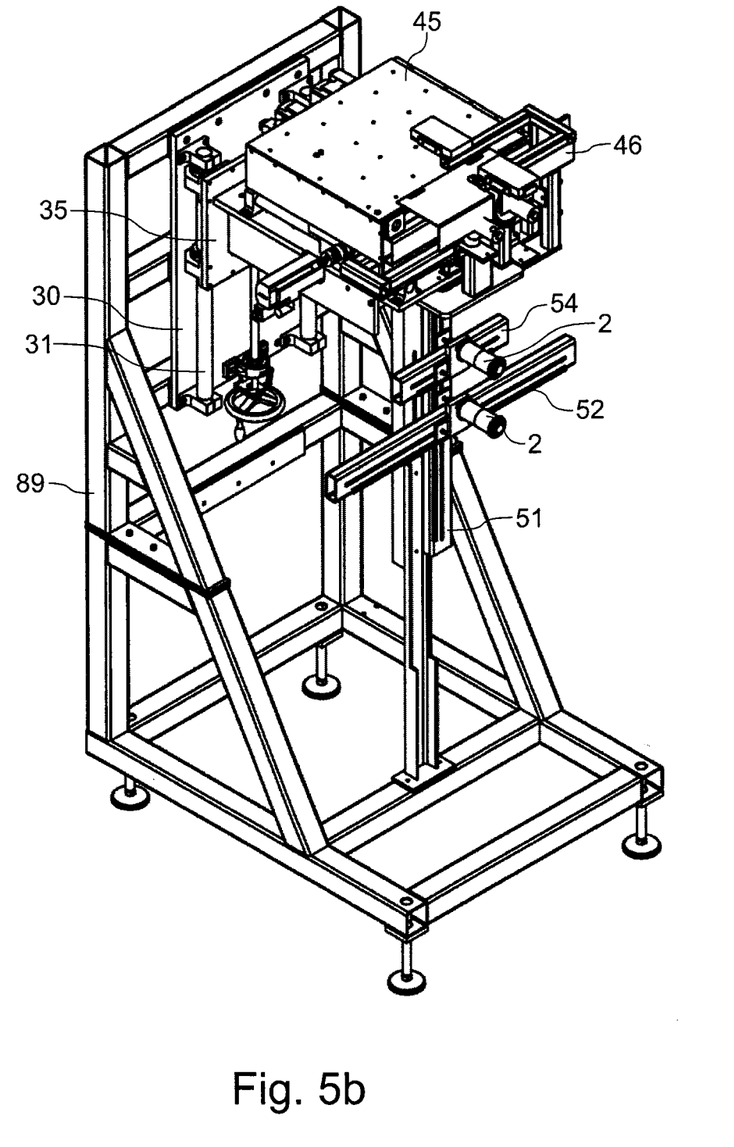
FIG. 5b is a perspective front view of the apparatus of FIG. 5a together with the cover used for shielding the region of shaping.

FIGS. 5a and 5b show two further perspective views of an apparatus for shaping according to the present invention.

Figure 7A:
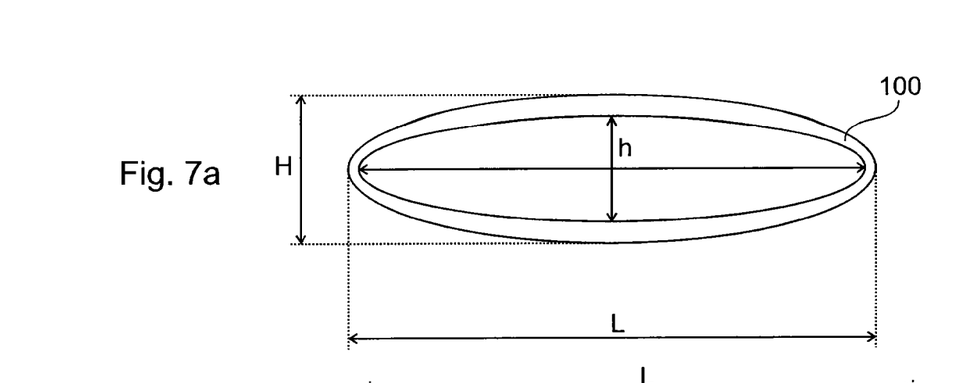
FIGS. 7a-7c are three examples of glass tubes, which are formed by means of an apparatus according to the present invention by means of a shaping process.
Figure 7B:
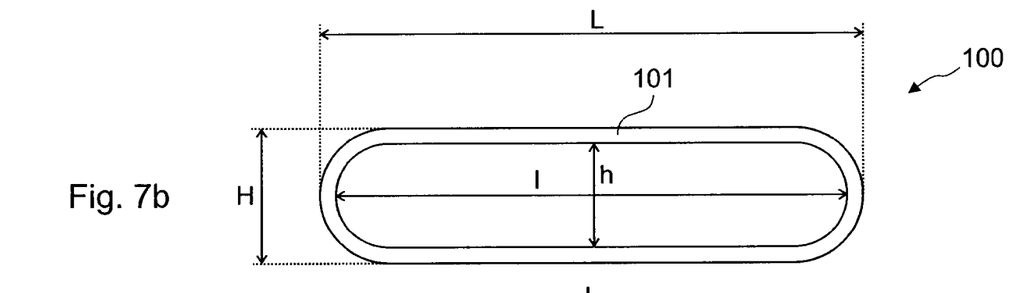
Figure 7C:
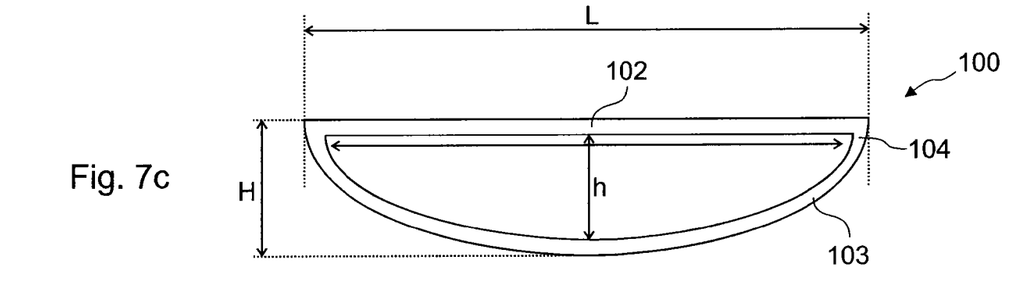

FIGS. 7a to 7c show various examples of glass tubes having a non-circular cross-section, which can be produced with high accuracy according to the present invention.

Referring to FIG. 7a, an oval glass tube 100 is formed, having a height H which is less than the maximum transverse dimension L. The bore in the direction of the minor axis is denoted by h. The wall thickness of such an oval tube may be constant over the entire circumference, or may vary continuously and symmetrically, as shown in FIG. 7a. Such an oval glass tube can be used for example as a pre-filter for LED flat screens. A 30% higher light yield was observed.

Referring to FIG. 7b, the deformed glass tube 100 is substantially rectangular, having semi-circularly rounded side edges and two longitudinal sides 101 of constant wall thickness extending in parallel with each other.

Referring to FIG. 7c, the glass tube 100 has a longitudinal side 102 and a mirror-symmetrical and convexely curved surface 103, the bending radii in the two corner regions 104 being very small.

Other application areas of such glass tubes are for example: oval tubes with high geometric accuracy for the use for the hermetic packaging of nano-particles of semiconductor material, wherein a high geometric accuracy (bore) is important; piston tubes or sheath tubes for discharge lamps, particularly flash lamps, where the fitting dimension should be minimized but not the light yield.

Referring to FIG. 1, the glass tube may be marked in accordance with the outer dimensions and/or internal dimensions detected downstream of the nip by means of the measurement devices 86, 87, for example by means of labeling or laser marking. Furthermore, the glass tube may also be sorted in accordance with the outer dimensions and/or internal dimensions detected downstream of the nip by means of the measurement devices 86, 87.

For an apparatus for squeezing of viscoplastic glass tubing with a tolerance of the inner diameter of +/−20 microns, the requirements with regard to the tolerances of the components are generally at a 10-fold accuracy of the tolerance specifications. To keep the costs at tolerable levels, conventionally the individual components of the apparatus were produced to have tolerances of max. +/−3 microns. The influence of temperature needs to be taken into consideration, because a change in temperature of 1K results in a change of the nip width of 1 micron. Therefore, the temperature of the whole system may be kept as constant as possible optionally by means of a cooling system. However, the surfaces of the squeezing rollers usually are heated uncontrollably by the glass tube strand or glass rod strand, which can be avoided by the continuous axial adjustment of at least one of the squeezing rollers, and preferably of both squeezing rollers, as described above. This can be supported further by the continuous monitoring and controlling or regulation of the width of the nip.

Although it has been described above that the apparatus is used for shaping (deforming) of glass tubes, the apparatus may be used in a corresponding manner also for the shaping (deforming) of glass rods. Preferably, the initial glass tube or initial glass rod has a circular cross section and the shaping (deformation) is performed to obtain a different profile. As will be readily apparent to the person skilled in the art upon reading the above description, the invention has been described above only by way of example and with reference to exemplary embodiments. Various modifications may be implemented without departing from the general concept and the scope of the present invention as set forth in the appended claims. Further, according to the present invention the features described above may be combined in a different manner as particularly disclosed above.

LIST OF REFERENCE NUMERALS

1 Squeezing rollers
2 guide pulleys
3 rotary lead-through
4 spindle shaft
5 bearing
6 bearing block
7 spindle bearing
8 clutch
9 servomotor
10 gear unit
11 flange
12 translation stage
13 adjustment of nip
15 guide rail
20 support plate
21 guide rod
22 bearing block
23 bearing block
24 adjusting spindle (for axial adjustment of rollers)
25 motor (for axial adjustment of rollers)
30 base
31 guide rod
32 bearing block
33 turning wheel (for height adjustment)
34 adjusting spindle
35 translation stage
37 adapter
38 adapter
45 cover with cooling unit
46 cover
47 opening
50 holding web
51 height adjustment
52 transverse adjustment
53 height adjustment
54 transverse adjustment
80 glass tube production line
81 glass tubing strand
82 drawing machine
83 pair of drawing rollers
84 pair of drawing rollers
85 frame
86 measurement device for outer diameter
87 measurement device for inner diameter
88 central control or central regulation
89 frame
90 bottom
100 glass tube
101 longitudinal side
102 flat longitudinal side
103 convex curved side
104 corner area

What is claimed is:

1. A method for shaping an elongated glass body, which is a glass tube or glass rod and has an initial profile, to an elongated glass body having a different profile, comprising the step of:
   passing the elongated glass body, in a hot malleable state, through a nip formed by squeezing rollers, said nip having a nip width which is less than an outer dimension of the initial profile;
   in which method
   the position of at least one of the squeezing rollers is varied continuously so that a contact area between the respective squeezing roller and the hot glass body is varied continuously by a continuous axial adjustment of the respective squeezing roller performed in accordance with a predetermined function, wherein the predetermined function is a cyclic reciprocating movement of the respective squeezing roller in an axial direction of said respective squeezing roller.

2. The method for shaping an elongated glass body according to claim 1, wherein
   the cyclic reciprocating movement is carried out in discrete steps, each having the same step size.

3. The method for shaping an elongated glass body according to claim 2, wherein a respective rotational movement of the squeezing rollers forming the nip is driven separately.

4. The method for shaping an elongated glass body according to claim 2, wherein the rotational movement of the squeezing rollers forming the nip is driven in synchronism or with a predetermined constant offset.

5. The method for shaping an elongated glass body according to claim 1, wherein
   an outer dimension and/or internal dimension of said different profile is detected downstream of the nip; and
   a parameter relevant for the shaping of the hot, malleable glass body to a glass body having said different profile is controlled or regulated correspondence with the detected outer dimension and/or internal dimension of said different profile to maintain the outer dimension and/or internal dimension of said different profile constant.

6. The method for shaping an elongated glass body according to claim 5, wherein said parameter is the width of said nip, a respective rotational speed or differential rotational speed of the squeezing rollers forming the nip.

7. The method for shaping an elongated glass body according to claim 6, wherein the glass body is a glass tube and wherein said parameter is an over-pressure applied to an inner volume of said malleable glass tube.

8. The method for shaping an elongated glass body according to claim 5, wherein the glass body is marked and/or sorted out according to the outer dimension and/or internal dimension detected downstream of said nip.

9. A method for producing an elongated glass body embodied as a glass tube or glass rod, comprising the step of:
drawing the elongated glass body from a glass melt to a glass tube or glass rod having an initial profile; and
forming said glass tube or glass rod in a hot, malleable state to a glass tube or glass rod having a different profile, comprising the step of:
passing the elongated glass body, in a hot malleable state, through a nip formed by squeezing rollers, said nip having a nip width which is less than an outer dimension of the initial profile, wherein the position of at least one of the squeezing rollers is varied continuously so that a contact area between the respective squeezing roller and the hot glass body is varied continuously by a continuous axial adjustment of the respective squeezing roller performed in accordance with a predetermined function, wherein the predetermined function is a cyclic reciprocating movement of the respective squeezing roller in an axial direction of said respective squeezing roller.

10. The method for producing an elongated glass body according to claim 9, wherein
the predetermined function is a cyclic reciprocating movement of the respective squeezing roller in an axial direction of said respective squeezing roller and is carried out in discrete steps, each having the same step size.

11. The method for producing an elongated glass body according to claim 10, wherein a respective rotational movement of the squeezing rollers forming the nip is driven separately.

12. The method for producing an elongated glass body according to claim 10, wherein the rotational movement of the squeezing rollers forming the nip is driven in synchronism or with a predetermined constant offset.

13. The method for producing an elongated glass body according to claim 9, wherein
an outer dimension and/or internal dimension of said different profile is detected downstream of the nip; and
a parameter relevant for the shaping of the hot, malleable glass body to a glass body having said different profile is controlled or regulated in correspondence with the detected outer dimension and/or internal dimension of said different profile to maintain the outer dimension and/or internal dimension of said different profile constant.

14. The method for producing an elongated glass body according to claim 13, wherein said parameter is the width of said nip, a respective rotational speed or differential rotational speed of the squeezing rollers forming the nip.

15. The method for producing an elongated glass body according to claim 13, wherein the glass body is a glass tube and wherein said parameter is an over-pressure applied to an inner volume of said malleable glass tube.

16. The method for producing an elongated glass body according to claim 13, wherein the glass body is marked and/or sorted out according to the outer dimension and/or internal dimension detected downstream of said nip.

* * * * *